(12) United States Patent
Hwang et al.

(10) Patent No.: US 10,451,151 B2
(45) Date of Patent: Oct. 22, 2019

(54) PLANETARY GEAR TRAIN OF AUTOMATIC TRANSMISSION FOR VEHICLE

(71) Applicants: Hyundai Motor Company, Seoul (KR); Kia Motors Corporation, Seoul (KR)

(72) Inventors: Seong Wook Hwang, Gunpo-si (KR); Hyun Sik Kwon, Seoul (KR); Wonmin Cho, Hwaseong-si (KR); Seongwook Ji, Gunpo-si (KR); Ki Tae Kim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 51 days.

(21) Appl. No.: 15/955,580

(22) Filed: Apr. 17, 2018

(65) Prior Publication Data

US 2019/0203809 A1 Jul. 4, 2019

(30) Foreign Application Priority Data

Dec. 28, 2017 (KR) ........................ 10-2017-0182962

(51) Int. Cl.
*F16H 3/66* (2006.01)
(52) U.S. Cl.
CPC ..... *F16H 3/666* (2013.01); *F16H 2200/0065* (2013.01); *F16H 2200/2041* (2013.01); *F16H 2200/2046* (2013.01)

(58) Field of Classification Search
CPC ............. F16H 3/666; F16H 2200/2041; F16H 2200/2046; F16H 2200/0065
See application file for complete search history.

(56) References Cited

U.S. PATENT DOCUMENTS

| 8,657,718 | B2 | 2/2014 | Iizuka et al. | |
|---|---|---|---|---|
| 2012/0214634 | A1* | 8/2012 | Mellet | F16H 3/725 475/149 |
| 2013/0040776 | A1* | 2/2013 | Mellet | F16H 3/666 475/275 |
| 2014/0371024 | A1* | 12/2014 | Goleski | F16H 3/66 475/275 |

* cited by examiner

Primary Examiner — Mark J Beauchaine
(74) Attorney, Agent, or Firm — Morgan, Lewis & Bockius LLP

(57) ABSTRACT

A planetary gear train may include first to third gear sets having three elements, respectively, the first and second gear sets mounted on input shaft, the third gear set mounted on output shaft, first shaft fixed to the first element and selectively connectable to the input shaft and housing, second shaft fixed to the second and sixth elements and selectively connectable to the input shaft and the housing, third shaft fixed to the third and fifth elements, fourth shaft fixed to the fourth element and selectively connectable to the housing, fifth shaft fixed to the seventh element and engaged with the third shaft, sixth shaft fixed to the eighth element and selectively connectable to the input shaft, seventh shaft fixed to the ninth element and the output shaft and selectively connectable to the fifth shaft, and two transfer gears each engaged between corresponding pair of shafts.

12 Claims, 2 Drawing Sheets

FIG. 2

| Shift-stage | Engagement element | | | | | | | Gear ratio |
|---|---|---|---|---|---|---|---|---|
| | C1 | C2 | C3 | C4 | B1 | B2 | B3 | |
| D1 | ● | | ● | | | | ● | 4.527 |
| D2 | | ● | ● | | | | ● | 2.893 |
| D3 | ● | ● | ● | | | | | 2.100 |
| D4 | | ● | ● | | ● | | | 1.413 |
| D5 | ● | | ● | ● | | | | 0.980 |
| | | ● | ● | ● | | | | |
| | | | ● | ● | ● | | | |
| | | | ● | ● | | ● | | |
| | | | ● | ● | | | ● | |
| D6 | | ● | | ● | ● | | | 0.839 |
| D7 | ● | ● | | ● | | | | 0.758 |
| D8 | | ● | | ● | | | ● | 0.719 |
| D9 | ● | | | ● | | | ● | 0.685 |
| D10 | | | | ● | ● | ● | | 0.633 |
| | | | | ● | ● | | ● | |
| | | | | ● | | ● | ● | |
| D11 | ● | | | ● | | | ● | 0.586 |
| REV | ● | | ● | | | ● | | -4.324 |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2017-0182962 filed on Dec. 28, 2017, the entire contents of which is incorporated herein for all purposes by this reference.

BACKGROUND OF THE INVENTION

Field of the Invention

The present invention relates to an automatic transmission for a vehicle.

Description of Related Art

Research on realizing more shift-stages of an automatic transmission are undertaken to achieve enhancement of fuel consumption and better drivability, and recently, increase of oil price is triggering a hard competition in enhancing fuel consumption of a vehicle.

In this sense, research on an engine has been undertaken to achieve weight reduction and to enhance fuel consumption by so-called downsizing research on an automatic transmission has been performed to simultaneously provide better drivability and fuel consumption by achieving more shift stages.

To achieve more shift stages for an automatic transmission, the number of parts is typically increased, which may deteriorate installability, production cost, weight and/or power flow efficiency.

Therefore, to maximally enhance fuel consumption of an automatic transmission having more shift stages, it is important for better efficiency to be derived by fewer number of parts.

In this respect, an eight-speed automatic transmission has been recently introduced, and a planetary gear train for an automatic transmission facilitating more shift stages is under investigation.

An automatic transmission of eight or more shift-stages typically includes three to four planetary gear sets and five to seven engagement elements (friction elements), and may easily become lengthy, deteriorating installability.

In this regard, disposing planetary gear sets in parallel or employing dog clutches instead of wet-type control elements is attempted. However, such an arrangement may not be widely applicable, and using dog clutches may easily deteriorate shift-feel.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle facilitating at least eleven forward speeds and one reverse speed, providing better performance and fuel efficiency of a vehicle.

An exemplary planetary gear train of an automatic transmission for a vehicle may include a first planetary gear set having first, second, and third rotation elements, a second planetary gear set having fourth, fifth, and sixth rotation elements, a third planetary gear set having seventh, eighth, and ninth rotation elements, an input shaft mounted with the first and second planetary gear sets on an external circumference of the input shaft, an output shaft disposed in parallel with the input shaft and mounted with the third planetary gear set on an external circumference of the output shaft, a first shaft fixedly connected to the first rotation element, and selectively connectable to the input shaft and a transmission housing respectively, a second shaft fixedly connected to the second rotation element and the sixth rotation element and selectively connectable to the input shaft and the transmission housing, a third shaft fixedly connected to the third rotation element and the fifth rotation element, a fourth shaft fixedly connected to the fourth rotation element and selectively connectable to the transmission housing, a fifth shaft fixedly connected to the seventh rotation element, and externally gear-engaged with the third shaft, a sixth shaft fixedly connected to the eighth rotation element, and selectively connectable to the input shaft by being externally gear-engaged, a seventh shaft fixedly connected to the ninth rotation element and the output shaft, and selectively connectable to the fifth shaft, and two transfer gears each forming external gear-engagement between a corresponding pair of shafts.

The planetary gear train may further include four clutches each selectively connecting a corresponding pair among the input shaft and the first to seventh shafts, and three brakes selectively connecting the first shaft, the second shaft, and the fourth shaft to the transmission housing respectively.

The four clutches may include a first clutch disposed between the input shaft and the first shaft, a second clutch disposed between the input shaft and the second shaft, a third clutch disposed between the fifth shaft and the seventh shaft, and a fourth clutch disposed between the input shaft and the sixth shaft. The three brakes may include a first brake disposed between the first shaft and the transmission housing, a second brake disposed between the second shaft and the transmission housing, and a third brake disposed between the fourth shaft and the transmission housing.

The two transfer gears may include a first transfer gear disposed between the input shaft and the sixth shaft, and a second transfer gear disposed between the third shaft and the fifth shaft.

The fourth clutch may be disposed between the input shaft and the first transfer gear.

The first planetary gear set may be a single pinion planetary gear set having a first sun gear, a first planet carrier, and a first ring gear as the first, second, and third rotation elements, respectively. The second planetary gear set may be a single pinion planetary gear set having a second sun gear, a second planet carrier, and a second ring gear as the fourth, fifth, and sixth rotation elements, respectively. The third planetary gear set may be a single pinion planetary gear set having a third sun gear, a third planet carrier, and a third ring gear as the seventh, eighth, and ninth rotation elements, respectively.

According to an exemplary planetary gear train, three planetary gear sets are dividedly on input shaft and output shaft that are in parallel, enhancing overall length and improving installability in a vehicle.

Furthermore, an exemplary planetary gear train employs two transfer gears in addition planetary gear sets, and optimal gear ratios may be obtained for respective types of vehicles by altering the number of gear teeth of the transfer gears in a wide range. Furthermore, acceleration performance may be optimized by setting appropriate gear ratios.

An exemplary planetary gear train may realize the eleven forward speeds and one reverse speed improving power delivery performance and fuel consumption by multi-stages of an automatic transmission.

Furthermore, effects that may be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart for respective control elements at respective shift-stages applicable to a planetary gear train according to an exemplary embodiment of the present invention.

Figure 1:
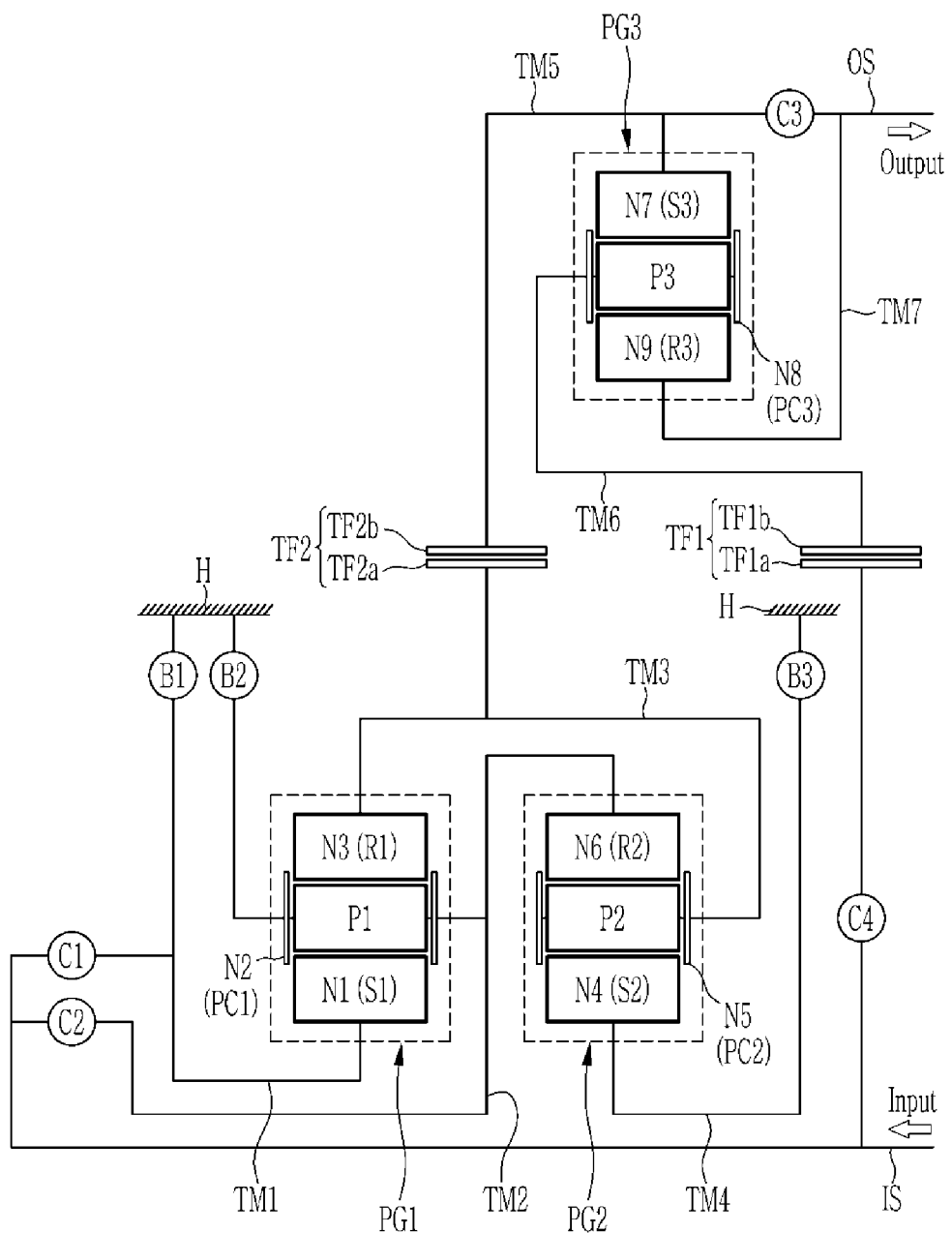
FIG. 1 is a schematic diagram of a planetary gear train according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the contrary, the invention(s) is/are intended to cover not only the exemplary embodiments of the present invention, but also various alternatives, modifications, equivalents and other embodiments, which may be included within the spirit and scope of the invention as defined by the appended claims.

Hereinafter, an exemplary embodiment of the present invention will be described in detail with reference to drawings.

The drawings and description are to be regarded as illustrative in nature and not restrictive, and like reference numerals designate like elements throughout the specification.

In the following description, dividing names of components into first, second, and the like is to divide the names because the names of the components are the same as or substantially the same as each other and an order thereof is not limited.

FIG. 1 is a schematic diagram of a planetary gear train according to an exemplary embodiment of the present invention.

Referring to FIG. 1, a planetary gear train according to an exemplary embodiment of the present invention includes an input shaft IS, an output shaft OS, first, second, and third planetary gear sets PG1, PG2, and PG3, two transfer gears TF1 and TF2, and engagement elements of four clutches C1, C2, C3, and C4 and three brakes B1, B2, and B3.

The input shaft IS is an input member and may receive a torque from a crankshaft of an engine through a torque converter.

The output shaft OS is an output element, and, disposed in parallel with the input shaft IS, outputs a shifted driving torque to a driveshaft through a differential apparatus.

The first and second planetary gear sets PG1 and PG2 are disposed on an external circumference of the input shaft IS, and the third planetary gear set PG3 is disposed on an external circumference of the output shaft OS which is disposed in parallel with the input shaft IS.

In an exemplary embodiment of the present invention, the planetary gear sets are disposed in the order of the first, second, and third planetary gear sets PG1, PG2, and PG3, from an engine side thereof.

The input shaft IS is an input member and may receive a torque from a crankshaft of an engine through a torque converter.

The output shaft OS is an output element disposed on a same axis with the input shaft IS, and outputs a shifted driving torque to a driveshaft through a differential apparatus.

The first planetary gear set PG1 is a single pinion planetary gear set, and includes a first sun gear S1, a first planet carrier PC1 rotatably supporting a plurality of first pinion gears P1 externally gear-meshed with the first sun gear S1, and a first ring gear R1 internally gear-meshed with the plurality of first pinion gears P1. The first sun gear S1 acts as a first rotation element N1, the first planet carrier PC1 acts as a second rotation element N2, and the first ring gear R1 acts as a third rotation element N3.

The second planetary gear set PG2 is a single pinion planetary gear set, and includes a second sun gear S2, a second planet carrier PC2 rotatably supporting a plurality of second pinion gears P2 externally gear-meshed with the second sun gear S2, and a second ring gear R2 internally gear-meshed with the plurality of second pinion gears P2. The second sun gear S2 acts as a fourth rotation element N4, the second planet carrier PC2 acts as a fifth rotation element N5, and the second ring gear R2 acts as a sixth rotation element N6.

The third planetary gear set PG3 is a single pinion planetary gear set, and includes a third sun gear S3, a third planet carrier PC3 rotatably supporting a plurality of third pinion gears P3 externally gear-meshed with the third sun gear S3, and a third ring gear R3 internally gear-meshed with the plurality of third pinion gears P3. The third sun gear S3 acts as a seventh rotation element N7, the third planet carrier PC3 acts as an eighth rotation element N8, and the third ring gear R3 acts as a ninth rotation element N9.

In the first and second planetary gear sets PG1 and PG2, the second rotation element N2 is fixedly connected to the sixth rotation element N6, and third rotation element N3 is fixedly connected to the fifth rotation element N5, forming four shafts TM1, TM2, TM3, and TM4.

In the third planetary gear set PG3, the rotation elements independently act, forming three shafts TM5, TM6, and TM7.

The seven shafts TM1 to TM7 are hereinafter described more specifically.

The first shaft TM1 is fixedly connected to the first rotation element N1 (first sun gear S1), and selectively connectable to the input shaft IS and the transmission housing H, respectively.

The second shaft TM2 is fixedly connected to second rotation element N2 (first planet carrier PC1) and sixth rotation element N6 (second ring gear R2)), and selectively connectable to the input shaft IS and the transmission housing H, respectively.

The third shaft TM3 is fixedly connected to third rotation element N3 (first ring gear R1) and fifth rotation element N5 (second planet carrier PC2).

The fourth shaft TM4 is fixedly connected to the fourth rotation element N4 (second sun gear S2), and selectively connectable to the transmission housing H.

The fifth shaft TM5 is fixedly connected to the seventh rotation element N7 (third sun gear S3), and externally gear-engaged with the third shaft TM3.

The sixth shaft TM6 fixedly connected to the eighth rotation element N8 (third planet carrier PC3), and externally gear-engaged with the input shaft IS selectively.

The seventh shaft TM7 is fixedly connected to the ninth rotation element N9 (third ring gear R3), and fixedly connected to the output shaft OS always acting as an output element.

Each of the seven shafts TM1 to TM7 may be a rotation member that fixedly interconnects the input and output shafts and rotation elements of the planetary gear sets PG1, PG2, PG3, and PG4, or may be a rotation member that selectively interconnects a rotation element to the transmission housing H, or may be a fixed member fixed to the transmission housing H.

In the disclosure, when two or more members are described to be "fixedly connected", where each of the members may be any of a shaft, an input shaft, an output shaft, a rotation member, and a transmission housing, it means that the fixedly connected members always rotate at a same speed.

When two or more members are described to be "selectively connectable" by an engagement element, it means that the selectively connectable members rotates separately when the engagement element is not engaged, and rotates at a same speed when the engagement element is engaged. It may be understood that in the case that a member is "selectively connectable" with a transmission housing by an engagement element, the member may be stationary when the engagement element is engaged.

Two transfer gears TF1 and TF2 are disposed at locations where two shafts are externally gear-meshed.

The first transfer gear TF1 includes a first transfer drive gear TF1a and a first transfer driven gear TF1b, where the first transfer drive gear TF1a is selectively connectable to the input shaft IS, and the first transfer driven gear TF1b is fixedly connected to sixth shaft TM6, whereby the first transfer gear TF1 externally gear-meshes the input shaft IS and the sixth shaft TM6, selectively.

The second transfer gear TF2 includes a second transfer drive gear TF2a and a second transfer driven gear TF2b, where a second transfer drive gear TF2a is fixedly connected to the third shaft TM3, and a second transfer driven gear TF2b is fixedly connected to the fifth shaft TM5, whereby the second transfer gear TF2 externally gear-meshes the third shaft TM3 and the fifth shaft TM5.

As a result, the shafts connected by the first and second transfer gears TF1 and TF2 rotate in opposite directions, and the gear ratios of the first and second transfer gears TF1 and TF2 may be predetermined in consideration of required speed ratio of the transmission.

The engagement elements of four clutches C1, C2, C3, and C4 are disposed between the seven shafts TM1 to TM9, the input shaft IS, and the output shaft OS, to form selective connections.

The seven shafts TM1 to TM7 may be selectively connectable to the transmission housing H, by control elements of three brakes B1, B2, and B3.

The seven engagement element of the four clutches C1 to C4 and the three brakes B1 to B3 are disposed as follows.

The first clutch C1 is disposed between the input shaft IS and the first shaft TM1, and selectively connects the input shaft IS and the first shaft TM1, controlling power delivery therebetween.

The second clutch C2 is disposed between the input shaft IS and the second shaft TM2, and selectively connects the input shaft IS and the second shaft TM2, controlling power delivery therebetween.

The third clutch C3 is disposed between the fifth shaft TM5 and the seventh shaft TM7 to selectively connect the fifth shaft TM5 and the seventh shaft TM7 such that the third planetary gear set PG3 may integrally rotate by the operation of the third clutch C3.

The fourth clutch C4 is disposed between the input shaft IS and the sixth shaft TM6 to selectively connect the input shaft IS and the sixth shaft TM6 through the external gear engagement of the first transfer gear TF1.

The first brake B1 is disposed between the first shaft TM1 and the transmission housing H, and selectively connects the first shaft TM1 to the transmission housing H.

The second brake B2 is disposed between the second shaft TM2 and the transmission housing H, and selectively connects the second shaft TM2 to the transmission housing H.

The third brake B3 is disposed between the fourth shaft TM4 and the transmission housing H, and selectively connects the fourth shaft TM4 to the transmission housing H.

The fourth clutch C4 disposed between the input shaft IS and the sixth shaft TM6 may be disposed between the input shaft IS and the first transfer gear TF1 or between the sixth shaft TM6 and the first transfer gear TF1, and FIG. 1 illustrates an example that the fourth clutch C4 is disposed between the input shaft IS and the first transfer gear TF1.

The engagement elements of the first, second, third and fourth clutches C1, C2, C3, and C4 and the first, second, and third brakes B1, B2, and B3 may be realized as multi-plate hydraulic pressure friction devices that are frictionally engaged by hydraulic pressure, however, it may not be understood to be limited thereto, since various other configuration that are electrically controllable may be available.

FIG. 2 is an operational chart for respective control elements at respective shift-stages applicable to a planetary gear train according to an exemplary embodiment of the present invention.

Referring to FIG. 2, a planetary gear train according to various exemplary embodiments of the present invention realizes shifting between eleven forward speeds and one reverse speed by operating three elements among the engagement elements of the first, second, third and fourth clutches C1, C2, C3, and C4 and the first, second, and third brakes B1, B2, and B3.

[The Reverse Speed]

In the reverse speed REV, the first and third clutches C1 and C3 and the second brake B2 are simultaneously operated.

As a result, the first shaft TM1 is connected to the input shaft IS by the operation of the first clutch C1 and the input torque is input to the first shaft TM1. In the present state, the second shaft TM2 acts as a fixed element by the operation of the second brake B2, and the input torque is reversed by a predetermined gear ratio and outputted through the third shaft TM3.

The torque of the third shaft TM3 is reduced by the gear ratio of the second transfer gear TF2 and input to the fifth shaft TM5. Furthermore, the third planetary gear set PG3 rotates by the operation of the third clutch C3, realizing the reverse speed and outputting a reverse torque through the fifth shaft TM5.

[The First Forward Speed]

In the first forward speed D1, the first and third clutches C1 and C3 and the third brake B3 are simultaneously operated.

As a result, the first shaft TM1 is connected to the input shaft IS by the operation of the first clutch C1 and the input torque is input to the first shaft TM1. In the present state, the fourth shaft TM4 acts as a fixed element by the operation of third brake B3, and the input torque is shifted by a predetermined gear ratio and outputted through the third shaft TM3.

The torque of the third shaft TM3 is reduced by the gear ratio of the second transfer gear TF2 and input to the fifth shaft TM5. Furthermore, the third planetary gear set PG3 rotates by the operation of the third clutch C3, realizing the first forward speed and outputting the torque input through the fifth shaft TM5 as inputted.

[The Second Forward Speed]

In the second forward speed D2, the second and third clutches C2 and C3 and the third brake B3 are simultaneously operated.

As a result, the second shaft TM2 is connected to the input shaft IS by the operation of the second clutch C2 and the input torque is input to the second shaft TM2. In the present state, the fourth shaft TM4 acts as a fixed element by the operation of the third brake B3, and the input torque is shifted by a predetermined gear ratio and outputted through the third shaft TM3.

The torque of the third shaft TM3 is reduced by the gear ratio of the second transfer gear TF2 and input to the fifth shaft TM5. Furthermore, the third planetary gear set PG3 rotates by the operation of the third clutch C3, outputting a torque as inputted, forming the second forward speed.

[The Third Forward Speed]

In the third forward speed D3, the first, second, and third clutches C1, C2, and C3 are simultaneously operated.

As a result, the first shaft TM1 and the second shaft TM2 are connected to the input shaft IS by the operation of the first and second clutch C1 and C2, and the input torque is simultaneously input to the first and second shafts TM1 and TM2. Therefore, the first and second planetary gear sets PG1 and PG2 integrally rotate and the input torque is outputted through the third shaft TM3 as inputted.

The torque of the third shaft TM3 is reduced by the gear ratio of the second transfer gear TF2 and input to the fifth shaft TM5. Furthermore, the third planetary gear set PG3 rotates by the operation of the third clutch C3, outputting a torque as inputted, forming the third forward speed.

[The Fourth Forward Speed]

In the fourth forward speed D4, the second and third clutches C2 and C3 and the first brake B1 are simultaneously operated.

As a result, the second shaft TM2 is connected to the input shaft IS by the operation of the second clutch C2, and the input torque is input to the second shaft TM2. In the present state, the first shaft TM1 acts as a fixed element by the operation of the first brake B1, and the input torque is shifted by a predetermined gear ratio and outputted through the third shaft TM3.

The torque of the third shaft TM3 is reduced by the gear ratio of the second transfer gear TF2 and input to the fifth shaft TM5. Furthermore, the third planetary gear set PG3 rotates by the operation of the third clutch C3, outputting a torque as inputted, forming the fourth forward speed.

[The Fifth Forward Speed]

In the fifth forward speed D5, the first, third, and fourth clutches C1, C3, and C4 are simultaneously operated.

As a result, the third planetary gear set PG3 integrally rotates by the operation of the third clutch C3, and a torque input through the sixth shaft TM6 by the operation of the fourth clutch C4 is merely outputted without changing. In the instant case, when the torque of the input shaft IS is transferred to the sixth shaft TM6 through the first transfer gear TF1, a rotation speed is modified, e.g., increased, by the gear ratio of the first transfer gear TF1 forming an overdrive transmission of torque in the fifth forward speed.

Regarding the first and second planetary gear sets PG1 and PG2, the first shaft TM1 is connected to the input shaft IS by the operation of the first clutch C1 and an input torque is input to the first shaft TM1. However, such an input torque does not affect to forming of the fifth speed since the first and second planetary gear sets PG1 and PG2 rotate freely because no other engagement element connected thereto is operated.

FIG. 2 illustrates that the fifth speed may also be realized by operating the second, third, and fourth clutches C2, C3, and C4, by operating the third and fourth clutches C3 and C4 and the first brake B1, by operating third and fourth clutches C3 and C4 and the second brake B2, or by operating third and fourth clutches C3 and C4 and the third brake B3, as well as by operating the first, third, and fourth clutch C1, C3, and C4. It may be understood that the fifth speed may be realized by operating merely the third and fourth clutches C3 and C4. In any of the above listed operation, only one of the first clutch and second clutch C1 and C2 and first to third brakes B1, B2, and B3 is operated, facilitating the first and second planetary gear sets PG1 and PG2 to rotate freely.

[The Sixth Forward Speed]

In the sixth forward speed D6, the second and fourth clutches C2 and C4 and the first brake B1 are simultaneously operated.

As a result, the second shaft TM2 is connected to the input shaft IS by the operation of the second clutch C2, and the input torque is input to the second shaft TM2. In the present state, first shaft TM1 acts as a fixed element by the operation of the first brake B1, and the input torque is shifted by a predetermined gear ratio and outputted through the third shaft TM3. The torque of the third shaft TM3 is reduced by the gear ratio of the second transfer gear TF2 and input to the fifth shaft TM5.

When the torque of the input shaft IS is transmitted to the sixth shaft TM6 by the operation of the fourth clutch C4, rotation speed is increased by the gear ratio of the first transfer gear TF1 while being transmitted to the sixth shaft TM6.

As such, a shifting occurs in the third planetary gear set PG3 by a difference in rotation speeds of the fifth shaft TM5 and the sixth shaft TM6, realizing the sixth forward speed of an overdrive state.

[The Seventh Forward Speed]

In the seventh forward speed D7, the first, second, and fourth clutches C1, C2, and C4 are simultaneously operated.

As a result, the first shaft TM1 and the second shaft TM2 are connected to the input shaft IS by the operation of the first and second clutch C1 and C2, and the input torque is simultaneously input to the first and second shafts TM1 and TM2. Therefore, the first and second planetary gear sets PG1 and PG2 integrally rotate and the input torque is outputted through the third shaft TM3 as inputted. The torque of the third shaft TM3 is reduced by the gear ratio of the second transfer gear TF2 and input to the fifth shaft TM5.

When the torque of the input shaft IS is transmitted to the sixth shaft TM6 by the operation of the fourth clutch C4, rotation speed is increased by the gear ratio of the first transfer gear TF1 while being transmitted to the sixth shaft TM6.

As such, a shifting occurs in the third planetary gear set PG3 by a difference in rotation speeds of the fifth shaft TM5 and the sixth shaft TM6, realizing the seventh forward speed of an overdrive state.

[The Eighth Forward Speed]

In the eighth forward speed D8, the second and fourth clutches C2 and C4 and the third brake B3 are simultaneously operated.

As a result, the second shaft TM2 is connected to the input shaft IS by the operation of the second clutch C2, and the input torque is input to the second shaft TM2. In the present state, fourth shaft TM4 acts as a fixed element by the operation of the third brake B3, and the input torque is shifted by a predetermined gear ratio and outputted through the third shaft TM3. The torque of the third shaft TM3 is reduced by the gear ratio of the second transfer gear TF2 and input to the fifth shaft TM5.

When the torque of the input shaft IS is transmitted to the sixth shaft TM6 by the operation of the fourth clutch C4, rotation speed is increased by the gear ratio of the first transfer gear TF1 while being transmitted to the sixth shaft TM6.

As such, a shifting occurs in the third planetary gear set PG3 by a difference in rotation speeds of the fifth shaft TM5 and the sixth shaft TM6, realizing the eighth forward speed of an overdrive state.

[The Ninth Forward Speed]

In the ninth forward speed D9, the first and fourth clutches C1 and C4 and the third brake B3 are simultaneously operated.

As a result, the first shaft TM1 is connected to the input shaft IS by the operation of the first clutch C1 and the input torque is input to the first shaft TM1. In the present state, fourth shaft TM4 acts as a fixed element by the operation of the third brake B3, and the input torque is shifted by a predetermined gear ratio and outputted through the third shaft TM3 The torque of the third shaft TM3 is reduced by the gear ratio of the second transfer gear TF2 and input to the fifth shaft TM5.

When the torque of the input shaft IS is transmitted to the sixth shaft TM6 by the operation of the fourth clutch C4, rotation speed is increased by the gear ratio of the first transfer gear TF1 while being transmitted to the sixth shaft TM6.

As such, a shifting occurs in the third planetary gear set PG3 by a difference in rotation speeds of the fifth shaft TM5 and the sixth shaft TM6, realizing the ninth forward speed of an overdrive state.

[The Tenth Forward Speed]

In the tenth forward speed D10, the fourth clutch C4 and the first and second brakes B1 and B2 are simultaneously operated.

As a result, the first and second planetary gear sets PG1 and PG2 become stationery by the operation of the first and second brakes B1 and B2.

When the torque of the input shaft IS is transmitted to the sixth shaft TM6 by the operation of the fourth clutch C4, rotation speed is increased by the gear ratio of the first transfer gear TF1 while being transmitted to the sixth shaft TM6.

As such, the fifth shaft TM5 in the third planetary gear set PG3 acts as a fixed element because the third shaft TM3 acts as a fixed element, and the torque is input to the sixth shaft TM6, realizing the tenth forward speed of an overdrive state.

FIG. 2 illustrates that the tenth speed may also be realized by operating the fourth clutch C4 and the first and third brakes B1 and B3, or by operating the fourth clutch C4 and the second and third brakes B2 and B3, as well as by operating the fourth clutch C4 and the first and second brakes B1 and B2. It may be obviously understood that any pair of the three brakes B1, B2, and B3 may be operated to enable the first and second planetary gear sets PG1 and PG2 to integrally stationary. This means that the tenth speed may be realized by operating the fourth clutch C4 and any two brakes among the first, second, and third brakes B1, B2, and B3.

[The Eleventh Forward Speed]

In the eleventh forward speed D11, the first and fourth clutches C1 and C4 and the second brake B2 are simultaneously operated.

As a result, the first shaft TM1 is connected to the input shaft IS by the operation of the first clutch C1 and the input torque is input to the first shaft TM1. In the present state, second shaft TM2 acts as a fixed element by the operation of the second brake B2, and the input torque is shifted by a predetermined gear ratio and outputted through the third shaft TM3 The torque of the third shaft TM3 is reduced by the gear ratio of the second transfer gear TF2 and input to the fifth shaft TM5.

When the torque of the input shaft IS is transmitted to the sixth shaft TM6 by the operation of the fourth clutch C4, rotation speed is increased by the gear ratio of the first transfer gear TF1 while being transmitted to the sixth shaft TM6.

As such, a shifting occurs in the third planetary gear set PG3 by a difference in rotation speeds of the fifth shaft TM5 and the sixth shaft TM6, realizing the eleventh forward speed of an overdrive state.

According to an exemplary planetary gear train, three planetary gear sets are dividedly on input shaft and output shaft that are in parallel, enhancing overall length and improving installability in a vehicle.

Furthermore, an exemplary planetary gear train employs two transfer gears in addition planetary gear sets, and optimal gear ratios may be obtained for respective types of vehicles by altering the number of gear teeth of the transfer gears in a wide range. Furthermore, acceleration performance may be optimized by setting appropriate gear ratios.

An exemplary planetary gear train may realize the eleven forward speeds and one reverse speed improving power delivery performance and fuel consumption by multi-stages of an automatic transmission.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train apparatus of an automatic transmission for a vehicle, the apparatus comprising:
   a first planetary gear set having a first rotation element, a second rotation element, and a third rotation element;
   a second planetary gear set having a fourth rotation element, a fifth rotation element, and a sixth rotation element;
   a third planetary gear set having a seventh rotation element, an eighth rotation element, and a ninth rotation element;
   an input shaft mounted with the first and second planetary gear sets on an external circumference of the input shaft;
   an output shaft disposed in parallel with the input shaft and mounted with the third planetary gear set disposed on an external circumference of the output shaft;
   a first shaft fixedly connected to the first rotation element, and selectively connectable to the input shaft and a transmission housing respectively;
   a second shaft fixedly connected to the second rotation element and the sixth rotation element and selectively connectable to the input shaft and the transmission housing;
   a third shaft fixedly connected to the third rotation element and the fifth rotation element;
   a fourth shaft fixedly connected to the fourth rotation element and selectively connectable to the transmission housing;
   a fifth shaft fixedly connected to the seventh rotation element, and externally gear-engaged with the third shaft;
   a sixth shaft fixedly connected to the eighth rotation element, and selectively connectable to the input shaft by being externally gear-engaged;
   a seventh shaft fixedly connected to the ninth rotation element and the output shaft, and selectively connectable to the fifth shaft; and
   two transfer gears each forming external gear-engagement between a corresponding pair among the first to seventh shafts.

2. The planetary gear train apparatus of claim 1, further including:
   four clutches each selectively connecting a corresponding pair among the input shaft and the first to seventh shafts; and
   three brakes selectively connecting the first shaft, the second shaft, and the fourth shaft to the transmission housing, respectively.

3. The planetary gear train apparatus of claim 2, wherein the four clutches comprise:
   a first clutch mounted between the input shaft and the first shaft;
   a second clutch mounted between the input shaft and the second shaft;
   a third clutch mounted between the fifth shaft and the seventh shaft; and
   a fourth clutch mounted between the input shaft and the sixth shaft, and
   the three brakes comprise:
   a first brake mounted between the first shaft and the transmission housing;
   a second brake mounted between the second shaft and the transmission housing; and
   a third brake mounted between the fourth shaft and the transmission housing.

4. The planetary gear train apparatus of claim 1, wherein the two transfer gears comprise:
   a first transfer gear disposed between the input shaft and the sixth shaft; and
   a second transfer gear disposed between the third shaft and the fifth shaft.

5. The planetary gear train apparatus of claim 4, wherein the fourth clutch is disposed between the input shaft and the first transfer gear.

6. The planetary gear train apparatus of claim 1, wherein
   the first planetary gear set is a single pinion planetary gear set having a first sun gear, a first planet carrier, and a first ring gear as the first rotation element, the second rotation element, and the third rotation element, respectively;
   the second planetary gear set is a single pinion planetary gear set having a second sun gear, a second planet carrier, and a second ring gear as the fourth rotation element, the fifth rotation element, and the sixth rotation element, respectively;
   the third planetary gear set is a single pinion planetary gear set having a third sun gear, a third planet carrier, and a third ring gear as the seventh rotation element, the eighth rotation element, and the ninth rotation element, respectively.

7. A planetary gear train apparatus of an automatic transmission for a vehicle, the apparatus comprising:
   a first planetary gear set having a first rotation element, a second rotation element, and a third rotation element;
   a second planetary gear set having a fourth rotation element, a fifth rotation element, and a sixth rotation element;
   a third planetary gear set having a seventh rotation element, an eighth rotation element, and a ninth rotation element;
   an input shaft mounted with the first and second planetary gear sets disposed on an external circumference of the input shaft; and
   an output shaft disposed in parallel with the input shaft and mounted with the third planetary gear set disposed on an external circumference of the output shaft, wherein the first rotation element is selectively connectable to the input shaft and a transmission housing respectively, the second rotation element is fixedly connected to the sixth rotation element, and selectively connectable to the input shaft and the transmission housing, respectively, the third rotation element is fixedly connected to the fifth rotation element, the fourth rotation element is selectively connectable to the transmission housing, the seventh rotation element is externally gear-engaged with the third rotation element, the eighth rotation element is selectively connectable to the input shaft by being externally gear-engaged therebetween, the ninth rotation element is fixedly connected to the output shaft, and selectively connectable to the seventh rotation element, two transfer gears respectively forming an external gear-engagement between the third rotation element and the seventh rotation element and between the input shaft and the eighth rotation element.

8. The planetary gear train apparatus of claim 7, wherein the seventh rotation element is externally gear-engaged with the fifth rotation element.

9. The planetary gear train apparatus of claim 7, wherein the two transfer gears comprise:
   a first transfer gear disposed between the input shaft and the eighth rotation element; and
   a second transfer gear disposed between the third rotation element and the seventh rotation element.

10. The planetary gear train apparatus of claim 7, further including:
    a first clutch mounted between the input shaft and the first rotation element;
    a second clutch mounted between the input shaft and the second rotation element;
    a third clutch mounted between the seventh rotation element and the ninth rotation element;
    a fourth clutch mounted between the input shaft and the eighth rotation element;
    a first brake mounted between the first rotation element and the transmission housing;
    a second brake mounted between the second rotation element and the transmission housing; and
    a third brake mounted between the fourth rotation element and the transmission housing.

11. The planetary gear train apparatus of claim 10, wherein the fourth clutch is disposed between the input shaft and the first transfer gear.

12. The planetary gear train apparatus of claim 7, wherein
    the first planetary gear set is a single pinion planetary gear set having a first sun gear, a first planet carrier, and a first ring gear as the first rotation element, the second rotation element, and the third rotation element, respectively;
    the second planetary gear set is a single pinion planetary gear set having a second sun gear, a second planet carrier, and a second ring gear as the fourth rotation element, the fifth rotation element, and the sixth rotation element, respectively;
    the third planetary gear set is a single pinion planetary gear set having a third sun gear, a third planet carrier, and a third ring gear as the seventh rotation element, the eighth rotation element, and the ninth rotation element, respectively.

* * * * *